(12) United States Patent
Kodera et al.

(10) Patent No.: US 11,065,974 B2
(45) Date of Patent: Jul. 20, 2021

(54) CONTROL SYSTEM FOR AUTONOMOUS VEHICLE

(71) Applicant: TOYOTA JIDOSHA KABUSHIKI KAISHA, Toyota (JP)

(72) Inventors: Hiroaki Kodera, Susono (JP); Takahito Endo, Sunto-gun (JP); Kensei Hata, Sunto-gun (JP); Yushi Seki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 199 days.

(21) Appl. No.: 16/374,771

(22) Filed: Apr. 4, 2019

(65) Prior Publication Data

US 2019/0315243 A1  Oct. 17, 2019

(30) Foreign Application Priority Data

Apr. 12, 2018 (JP) .............................. JP2018-076661

(51) Int. Cl.
  *B60L 53/36* (2019.01)
  *B60L 58/25* (2019.01)
  *B60L 58/15* (2019.01)
  *B60L 53/38* (2019.01)

(52) U.S. Cl.
  CPC ............... *B60L 53/36* (2019.02); *B60L 53/38* (2019.02); *B60L 58/15* (2019.02); *B60L 58/25* (2019.02)

(58) Field of Classification Search
  CPC ......... Y02T 10/62; Y02T 10/64; Y02T 10/70; Y02T 10/7072; Y02T 10/72; Y02T 90/12; Y02T 90/14; Y02T 90/16; Y02T 90/167; B60L 58/12; B60L 58/15; B60L 58/25; B60L 50/16; B60L 50/62; B60L 53/36; B60L 53/38; B60L 53/66; B60L 53/67; B60L 53/68; B60L 2240/12; B60L 2240/423; B60L 2240/443; B60L 2240/622; B60L 2240/70; B60L 15/2045;
  (Continued)

(56) References Cited

U.S. PATENT DOCUMENTS

2010/0059300 A1* 3/2010 Brown ................ B60L 15/2009
                                               180/65.285
2010/0101879 A1* 4/2010 McVickers ....... H01M 10/0587
                                               180/65.51
(Continued)

FOREIGN PATENT DOCUMENTS

CN    102343826 A   *  2/2012
CN    105015542 A   * 11/2015   ............ B60W 20/13
(Continued)

*Primary Examiner* — Atul Trivedi
(74) *Attorney, Agent, or Firm* — Oliff PLC

(57) ABSTRACT

A vehicle control system for an autonomous vehicle configured to charge a battery by an external power source during propulsion while preventing a deterioration of the battery. A controller detects a charging zone where the electric storage device can be charged by the external power source, and restricts at least any one of a charging of the electric storage device and a discharging of electricity from the electric storage device so as to limit a load factor of the electric storage device to be smaller than a predetermined limit value when the vehicle passes through the charging zone.

9 Claims, 6 Drawing Sheets

(58) Field of Classification Search
CPC ............. B60L 2260/32; B60L 2260/52; B60L 2260/54; B60L 7/10; Y04S 30/12
USPC .......................................................... 701/22
See application file for complete search history.

(56) References Cited

U.S. PATENT DOCUMENTS

| | | | |
|---|---|---|---|
| 2011/0166731 A1* | 7/2011 | Kristinsson | B60W 10/26 701/22 |
| 2012/0245750 A1 | 9/2012 | Paul et al. | |
| 2013/0197734 A1* | 8/2013 | Okura | B60L 50/51 701/22 |
| 2015/0135863 A1* | 5/2015 | Dalum | B60K 17/28 74/11 |
| 2015/0221145 A1* | 8/2015 | Nomura | B60L 15/2009 701/31.7 |
| 2016/0243947 A1* | 8/2016 | Perkins | B60L 58/20 |
| 2016/0244044 A1* | 8/2016 | Miller | B60W 20/13 |
| 2017/0028978 A1* | 2/2017 | Dunlap | B60W 20/13 |
| 2017/0151884 A1* | 6/2017 | Khosravi | B60L 58/12 |
| 2018/0056982 A1* | 3/2018 | Endo | B60W 10/18 |
| 2018/0093656 A1* | 4/2018 | Yamazaki | B60L 1/003 |
| 2018/0120841 A1* | 5/2018 | Endo | B60W 10/06 |
| 2018/0134176 A1* | 5/2018 | Symanow | B60L 11/1868 |
| 2018/0201151 A1* | 7/2018 | Dudar | G01R 31/3647 |
| 2018/0354492 A1* | 12/2018 | Meyer | B60K 6/485 |
| 2019/0001805 A1* | 1/2019 | Colavincenzo | B60W 10/06 |
| 2019/0039434 A1* | 2/2019 | Wallace | B60L 58/27 |
| 2019/0294173 A1* | 9/2019 | Szubbocsev | G01C 21/3469 |
| 2019/0315243 A1* | 10/2019 | Kodera | B60L 58/25 |
| 2020/0070679 A1* | 3/2020 | Wang | B60L 58/12 |
| 2020/0164763 A1* | 5/2020 | Holme | B60L 58/10 |
| 2020/0290742 A1* | 9/2020 | Kumar | B64D 27/02 |
| 2020/0298722 A1* | 9/2020 | Smolenaers | B60L 53/24 |

FOREIGN PATENT DOCUMENTS

| | | | | |
|---|---|---|---|---|
| CN | 107031603 A | * | 8/2017 | ............. B60L 58/26 |
| CN | 108688485 A | * | 10/2018 | ............. H02J 7/022 |
| CN | 109591628 A | * | 4/2019 | |
| JP | H11-325234 A | | 11/1999 | |
| JP | 2001-182812 A | | 7/2001 | |
| JP | 2012-205425 A | | 10/2012 | |
| JP | 2014-131473 A | | 7/2014 | |
| JP | 2014-133538 A | | 7/2014 | |
| JP | 2016-082677 A | | 5/2016 | |
| WO | WO-2010115573 A1 | * | 10/2010 | ......... B60L 15/2045 |
| WO | WO-2014196244 A1 | * | 12/2014 | ............. B60L 1/003 |
| WO | 2017/199775 A1 | | 11/2017 | |

\* cited by examiner

CONTROL SYSTEM FOR AUTONOMOUS VEHICLE

CROSS REFERENCE TO RELATED APPLICATIONS

The present disclosure claims the benefit of Japanese Patent Application No. 2018-076661 filed on Apr. 12, 2018 with the Japanese Patent Office, the disclosure of which are incorporated herein by reference in its entirety.

BACKGROUND

Field of the Disclosure

An embodiment of the present disclosure relates to the art of a control system for a vehicle that can be operated autonomously without requiring a driver to operate an accelerator pedal, a brake pedal, and a steering wheel.

Discussion of the Related Art

A charging system that charges a battery darling propulsion of a vehicle using an external power source is known in the art. For example, JP-A-2014-131473 describes a contact charging system for an electric vehicle that charges a battery by bringing a charging arm into contact to an external power source during propulsion of the vehicle. According to the teachings of JP-A-2014-131473, specifically, the charging arm extends outwardly widthwise from a side of the vehicle, and the charging arm is brought into contact to a wire extending along a traveling direction of the vehicle to charge the battery. A non-contact charging system that supplies electricity to a battery of a vehicle by generating an electromotive force of a coil arranged along a road is also known in the art.

JP-A-2016-082677 describes a power supply device of a hybrid vehicle. According to the teachings of JP-A-2016-082677, when a temperature of a battery is lower than a predetermined level, the temperature of the battery is raised to prevent a reduction in a performance of the vehicle in an electric vehicle mode.

According to the teachings of JP-A-2014-131473, the battery can be charged during propulsion of the vehicle. Therefore, it is possible to reduce a burden of e.g., stopping at a charging station can be reduced. However, if the battery is charged during propulsion in the electric vehicle mode in which the vehicle is powered by a motor, the battery is charged simultaneously with discharging the electricity to operate the motor. In this situation, the battery may be overloaded to generate a heat, and a temperature of the battery would be raised excessively. As a result, a performance of the battery would be reduced and a cycle life of the battery would be shortened.

In addition, according to the teachings of JP-A-2014-131473, a regenerated electricity generated as a result of generating a braking force by a motor may be accumulated in the battery. On the other hand, in the hybrid vehicle having an engine and a motor taught by JP-A-2016-082677, a series mode can be selected. In the series mode, a generator is driven by the engine, and a resultant electricity may be accumulated in the battery. In those cases, during propulsion, the battery is charged not only by the electricity supplied from the external power source but also by the electricity generated by the engine and the motor. As a result, the battery may be overcharged to cause a reduction in the performance of the battery.

The above-explained charging system for charging the battery during propulsion is suitable for an autonomous vehicle. However, in order to manipulate the autonomous vehicle, the electricity will be consumed by operating at least a RADAR and a LIDAR, and hence power supply from the battery cannot be stopped during propulsion. Therefore, in order to charge the battery of the autonomous vehicle properly by the external power source, it is required to improve the conventional charging system.

SUMMARY

Aspects of embodiments of the present disclosure have been conceived noting the foregoing technical problems, and it is therefore an object of the present disclosure to provide a control system for an autonomous vehicle configured to charge a battery by an external power source during propulsion while preventing a deterioration of the battery.

According to one aspect of the present disclosure, there is provided a control system that is applied to an autonomous vehicle comprising: a motor having a venerating function that serves as a prime mover; an electric storage device that is electrically connected to the motor; a charging system that charges the electric storage device using an external power source located on a road during propulsion of the vehicle; a brake device that applies a braking torque to a wheel; and a steering device that controls an angle of at least any one of pairs of front wheels and rear wheels. The control system comprises a controller that controls the prime mover, the brake device, the steering system, and the electric storage device to operate the vehicle autonomously without requiring a manual operation. In order to achieve the above-explained objective, according to one aspect of the present disclosure, the controller is configured to: detect a charging zone where the electric storage device can be charged by the external power source; and restrict at least any one of a charging of the electric storage device and a discharging of electricity from the electric storage device so as to limit a load factor of the electric storage device to be smaller than a predetermined limit value when the vehicle passes through the charging zone.

In a non-limiting embodiment, a temperature of the electric storage device may be employed as parameter of the limit value of the load factor of the electric storage device. The controller may be further configured to determine that the load factor is smaller than the limit value when the temperature of the electric storage device falls within a predetermined temperature range.

In a non-limiting embodiment, the controller may be further configured to coast the vehicle within the charging zone so as to restrict the discharging of electricity from the electric storage device.

In a non-limiting embodiment, the controller may be further configured to control the speed of the vehicle before entering into the charging zone so as to adjust the speed of the vehicle within the charging zone between a legal lower limit speed and a legal upper limit speed.

In a non-limiting embodiment, the prime mover may include an engine. The controller may be further configured to: determine that the motor is not allowed to generate a required drive force due to a fact that the load factor of the electric storage device is expected to exceed the limit value when the vehicle passes through the charging zone; and propel the vehicle by operating the engine to generate a drive torque when the motor is not allowed to generate the required drive torque.

In a non-limiting embodiment, the controller may be further configured not to restrict a discharging of the electricity from the electric storage device at least to elements to operate the vehicle autonomously when the vehicle passes through the charging zone.

According to another aspect of the present disclosure, there is provided a control system for an autonomous vehicle that is operated in line with a travel plan to control a driving force and a vehicle speed at each point of a predetermined travelling route to a destination, by controlling the driving force and a braking force autonomously without requiring a manual operation. The control system comprises a controller that creates the travel plan. In order to achieve the above-explained objective, according to another aspect of the present disclosure, the controller is configured to: determine an availability of a charging zone where an electric storage device can be charged by an external power source while propelling the vehicle on the travelling route to the destination; and creates the travel plan in such a manner as to restrict at least any one of a charging of the electric storage device and a discharging of electricity from the electric storage device so as to limit a load factor of the electric storage device to be smaller than a predetermined limit value when the vehicle passes through the charging zone, and to adjust a speed of the vehicle before entering into the charging zone, in a case that the charging zone is available on the travelling route.

In a non-limiting embodiment, the controller may be further configured to control the speed of the vehicle before entering into the charging zone so as to adjust the speed of the vehicle within the charging zone between a legal lower limit speed and a legal upper limit speed.

In a non-limiting embodiment, the vehicle may comprise a motor having a generating function that serves as a prime mover. The controller may be further configured to create the travel plan in such a manner as to coast the vehicle within the charging zone without operating the motor to generate a driving torque.

Thus, according to at least one aspect of the present disclosure, charging of the electric storage device or discharging from the electric storage device will be restricted when charging the electric storage device by the external power source arranged in the charging zone, so as to limit the load factor of the electric storage device to the level at which the electric storage device is allowed to discharge a minimum required electrical energy to operate the vehicle autonomously. According to at least one aspect of the present disclosure, therefore, an overload of the electric storage device can be prevented when charging the electric storage device by the external power source. For this reason, an output performance and a cycle life of the electric storage device will not be reduced.

As described, when charging the electric storage device by the external power source in the charging zone, a power supply from the electric storage device to the motor will be restricted in the charging zone by coasting the vehicle within the charging zone. That is, the electric storage device will not discharge electricity when being charged. According to at least one aspect of the present disclosure, therefore, an overload of the electric storage device can be prevented certainly.

As also described, before entering into the charging zone, the vehicle speed is controlled in such a manner as to adjust the vehicle speed within the charging zone between the legal lower limit speed and the legal upper limit speed. According to at least one aspect of the present disclosure, therefore, the vehicle is allowed to coast within the chasing zone at an appropriate speed.

Further, according to at least one aspect of the present disclosure, the vehicle may be propelled by the engine when passing through the charging zone while restricting power supply from the electric storage device to the motor. According to at least one aspect of the present disclosure, therefore, the required drive torque to propel the vehicle may be ensured by the engine. For this reason, a shortage of the drive torque can be prevented even when the electricity cannot be supplied to the motor from the electric storage device.

BRIEF DESCRIPTION OF THE DRAWINGS

Features, aspects, and advantages of exemplary embodiments of the present invention will become better understood with reference to the following description and accompanying drawings, which should not limit the invention in any way.

FIGS. 3A and 3B are block diagrams showing charging systems according to the exemplary embodiment, in which FIG. 3A shows the charging system for a vehicle having one battery, and FIG. 3B shows the charging system for a vehicle having two batteries;

DETAILED DESCRIPTION OF THE PREFERRED EMBODIMENT(S)

Embodiments of the present invention will now be explained with reference to the accompanying drawings. Note that the embodiments to be explained are merely examples of the present disclosure, and do not limit a scope of the present disclosure.

Figure 1:
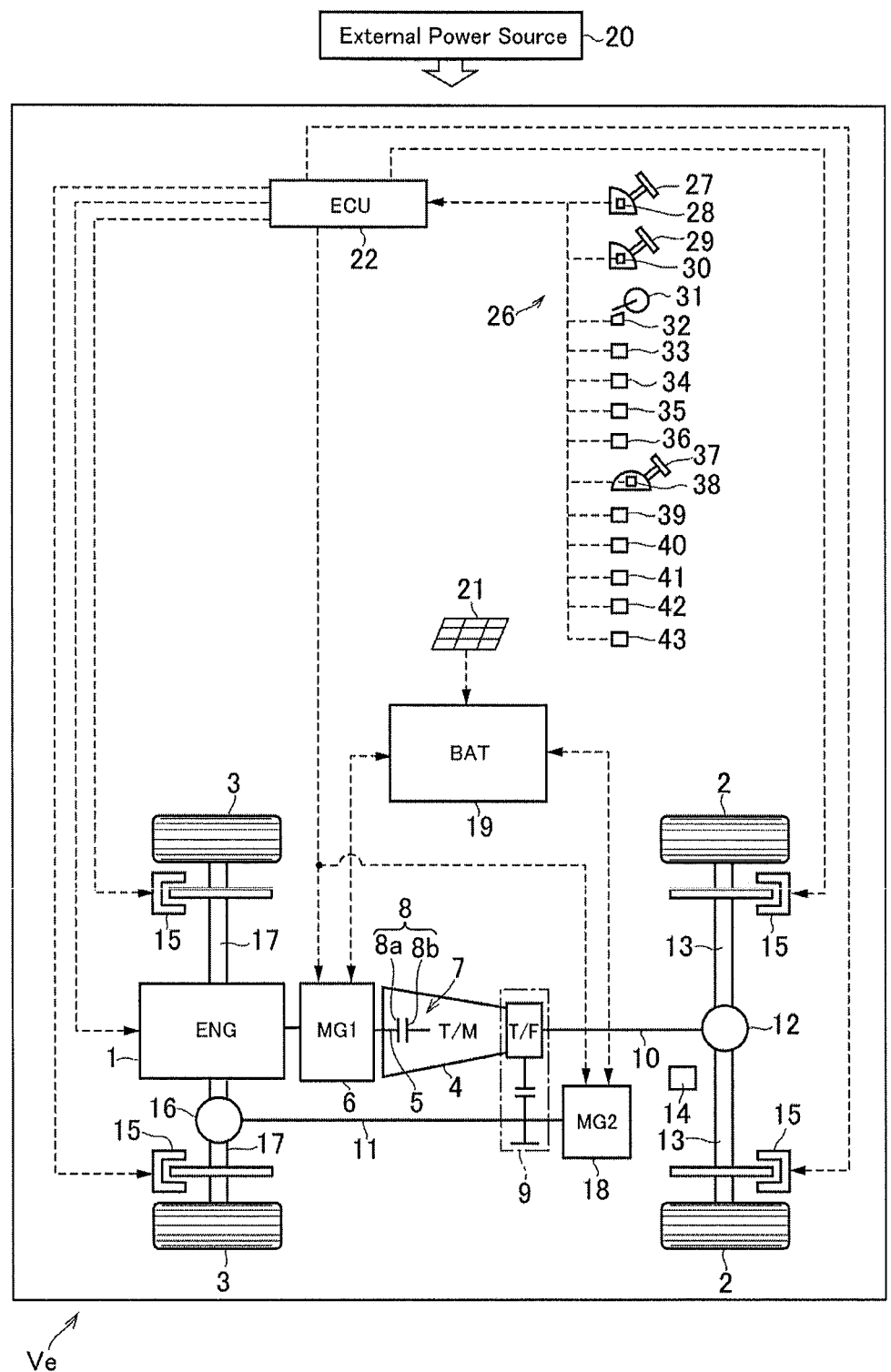
FIG. 1 is a schematic illustration showing an example of a structure of the vehicle to which the control system according to the exemplary embodiment is applied.

The control system according to at least one embodiment of the present disclosure may be applied to a vehicle having a motor serving as a prime mover and a secondary battery connected to the motor to supply electricity to the motor. For example, the control system may be applied to an electric vehicle that is powered only by a motor and a hybrid vehicle that is powered by a motor and an engine. The electric vehicle includes an electric vehicle having in-wheel motors for driving wheels directly. The hybrid vehicle includes a series hybrid vehicle in which electricity is generated by an engine torque and drive force is generated by a motor torque, and a series-parallel hybrid vehicle in which electricity and drive force are generated by an engine torque. In addition, the control system may be applied to a plug-in electric vehicle and a plug-in hybrid vehicle in which a battery can be charged by an external power source through a battery charger. Turning now to FIG. 1, there is shown one example of a structure of a four-wheel drive layout (i.e., 4WD or AWD) hybrid vehicle (to be simply called the "vehicle" hereinafter) Ve comprising an engine and two motors to which the control system according to the exemplary embodiment is applied.

The vehicle Ve may be operated autonomously without operating an accelerator and a brake manually by a driver. The vehicle Ve is provided with a charging system adapted to charge a battery by an external power source during propulsion. The charging system includes a contact type charging system adapted to charge the battery by bringing the vehicle into contact to the external power source during propulsion, and a non-contact type charging system adapted to charge the battery without contacting the vehicle to the external power source.

Specifically, the vehicle Ve shown in FIG. 1 is an FR (i.e., front-engine rear-drive layout) based four-wheel drive vehicle. In the vehicle Ve, an engine 1 is arranged in a front section of the vehicle Ve between front wheels 3 (i.e., at about the width center of the vehicle). Nonetheless, the control system according to the exemplary embodiment may also be applied to an FF (i.e., front-engine front-drive layout) based four-wheel drive vehicle.

For example, an internal combustion engine such as a gasoline engine and a diesel engine may be used as the engine 1. A transmission 4 is disposed on an output side of the engine 1, and the output shaft (not shown) of the engine 1 is connected to an input shaft 5 of the transmission 4. An opening degree of an accelerator and a fuel injection in the engine 1 are controlled in accordance with a depression of an accelerator pedal to generate a required torque. For example, given that the gasoline engine is used as the engine 1, an opening degree of a throttle valve, an amount of fuel supply or fuel injection, a commencement and a termination of ignition, an ignition timing etc. may be controlled electrically. Otherwise, given that the diesel engine is used as the engine 1, an amount of fuel injection, an injection timing, an opening degree of a throttle valve of an Exhaust Gas Recirculation (EGR) system etc. may be controlled electrically.

The transmission 4 is disposed downstream of a first motor (referred to as "MG1" in FIG. 1) 6 to transmit torque between the engine 1 or the first motor 6 and drive wheels. The transmission 4 is adapted to change a ratio of an input speed to an output speed arbitrarily. For example, a geared transmission in which a gear stage is shifted stepwise, and a continuously variable transmission in which a speed ratio is varied continuously may be used as the transmission 4. The transmission 4 is provided with a clutch 7 that is engaged to transmit torque, and that is disengaged to interrupt torque transmission thereby establishing a neutral stage.

The clutch 7 selectively transmits torque or interrupts torque transmission between the drive wheels and the engine 1 (and the first motor 6). In the embodiment illustrated in FIG. 1, the clutch 7 is arranged in the transmission 4. Specifically, the clutch 7 includes a friction plate 8 (or 8a) connected to a rotary member (not shown) in the side of the engine 1, and a friction plate 8 (or 8b) connected to a rotary member (not shown) in the side of rear wheels 2. Although not elaborated in FIG. 1, a multi-plate clutch in which a plurality of the friction plates 8a and a plurality of the friction plates 8b are arranged alternately may be adopted as the clutch 7. Instead, the clutch 7 may also be disposed between the first motor 6 and the transmission 4 to serve as a starting clutch. In any of these cases, the engine 1 and the first motor 6 are disconnected from the powertrain of the vehicle Ve by disengaging the clutch 7, and connected to the powertrain by engaging the clutch 7.

Thus, the engine 1 and the transmission 4 are arranged coaxially, and the first motor 6 is disposed between the engine 1 and the transmission 4. The first motor 6 serves not only as a motor to generate torque when driven by electricity suppled thereto, but also as a generator to generate electricity when driven by torque of the engine 1. That is, the first motor 6 is a motor-generator. For example, a permanent magnet type synchronous motor, and an induction motor may be adopted as the first motor 6. The first motor 6 may be connected to the output shaft of the engine 1 or the input shaft 5 of the transmission 4 not only directly but also indirectly through a transmission device.

A transfer 9 is disposed on an output side of the transmission 4 to distribute output power of the engine 1 or output torque of the transmission 4 to front wheels 3 and the rear wheels 2. A rear propeller shaft 10 is connected to an output member (not shown) to deliver torque to the rear wheels 2, and a front propeller shaft 11 is connected to an output member (not shown) to deliver torque to the front wheels 3.

For example, a wrapping transmission using a chain or belt, a gear unit and so on may be used as the transfer 9. In addition, a full-time four-wheel drive mechanism including a differential mechanism that allows a differential rotation between the front wheels 3 and the rear wheels 2 and a restriction mechanism that restricts the differential rotation between the front wheels 3 and the rear wheels 2 by a friction clutch or the like, and a part-time four-wheel drive mechanism that selectively interrupt torque transmission to the front wheels 3 may also be used as the transfer 9.

Specifically, the rear propeller shaft 10 extends from the transmission 4 or the transfer 9 to be connected to a rear differential gear unit 12 as a final reduction to distribute torque to the rear wheels 2 through drive shafts 13 extending laterally. On the other hand, the front propeller shaft 11 also extends from the transfer 9 to be connected to a front differential gear unit 16 as a final reduction to distribute torque to the front wheels 3 through drive shafts 17 extending laterally. At least one of the pairs of the front wheels 3 and the rear wheels 2 is turned by a steering system 14 in accordance with a rotational angle of a steering wheel 31. Each of the front wheels 3 and the rear wheels 2 are individually provided with a brake device (as will be simply called the "brake" hereinafter) 15 to apply braking force to the wheels.

A second motor (referred to as "MG2" in FIG. 1) 18 is connected to the transfer 9 to drive the front propeller shaft 11. The second motor 18 is operated mainly as a motor to generate a drive torque to propel the vehicle Ve. In order to regenerate energy during decelerating the vehicle Ve, it is preferable to use a motor-generator such as a permanent magnet synchronous motor as the second motor 18.

The first motor 6 and the second motor 18 are electrically connected with a battery (referred to as "BAT" in FIG. 1) 19 as an electric storage device through a converter (not shown). For example, a secondary battery such as a nickel hydride battery, a lithium-ion battery, and a capacitor may be adopted as the battery 19. In the vehicle Ve, therefore, the first motor 6 and the second motor 18 may be operated individually as a motor by supplying electricity to those motors from the battery 19, and electricity generated by the first motor 6 and the second motor 18 may be accumulated in the battery 19. It is also possible to operate the second motor 18 as a motor by supplying electricity generated by the first motor 6 to the second motor 18 so as to propel the vehicle Ve by an output torque of the second motor 18.

As described, the vehicle Ve is provided with a charging system to charge the battery 19 using an external power source during propulsion. According to the exemplary embodiment, not only a contact type charging system but also a non-contact type charging system (i.e., a wireless power supplying system) may be employed in the vehicle Ve. Specifically, the contact type charging system is adapted to charge the battery 19 by bringing the vehicle Ve into contact to an external power source 20. On the other hand, the non-contact type charging system (i.e., a wireless power supplying system) is adapted to charge the battery 19 without contacting the vehicle Ve to the external power source 20. In a case of employing the contact type charging system, the vehicle Ve is provided with a current collector such as pantograph, and the battery 19 is charged by bringing the current collector into contact to a contact wire (or rail) arranged along a lane within a predetermined charging zone. In this case, for example, the charging arm taught by JP-A-2014-131473 may be arranged on the side of the vehicle Ve to be contacted to the contact wire to charge the battery 19.

Otherwise, in a case of employing the non-contact type charging system, electricity is supplied to the battery 19 from a road surface utilizing an electromagnetic induction during propulsion in a predetermined lane. Specifically, a magnetic field is established by energizing a primary coil (i.e., a transmission coil) arranged in the road surface, and a current is generated in a secondary coil (i.e., a terminal coil) arranged in the vehicle Ve as a result that the magnetic field passes through the secondary coil. In this case, the battery 19 may be charged without connecting a charging plug with a charging station or the like. In other words, the battery 19 may be charged wirelessly.

Thus, according to the exemplary embodiment of the present disclosure, the battery 19 may be charged by connecting the contact type charging system or the non-contact type charging system with an infrastructure for supplying an electric power to the vehicle Ve during propulsion. Accordingly, the infrastructure for supplying an electric power to the vehicle Ve corresponds to the external power source of the exemplary embodiment.

The vehicle Ve is further provided with an on-board generator 21 as another charging system. According to the embodiment shown in FIG. 1, a solar panel is arranged on a roof of the vehicle Ve to serve as the on-board generator 21, and electricity generated by the solar panel may be accumulated in the battery 19.

An operating mode of the vehicle Ve may be selected form a plurality of modes by controlling the engine 1, the first motor 6, the second motor 18, and the clutch 7. For example, the operating mode of the vehicle Ve may be selected from: (1) an electric vehicle mode (to be abbreviated as the "EV mode" hereinafter) in which a drive force is venerated by delivering torque venerated by the second motor 18 to the drive wheels while stopping the engine 1; (2) a series hybrid vehicle mode (to be abbreviated as the "series HV mode" hereinafter) in which the engine 1 is operated while disengaging the clutch 7, the first motor 6 is operated as a generator by a torque of the engine 1 to generate electricity, and a drive force is generated by delivering torque generated by the second motor 18 to the drive wheels; and (3) a parallel hybrid vehicle mode (to be abbreviated as the "parallel HV mode" hereinafter) in which the engine 1 is operated while engaging the clutch 7, and a drive force is generated by delivering torques of the engine 1 and the second motor 18 to the drive wheels. Specifically, the operating mode of the vehicle Ve is selected with reference to a map for selecting the operating mode based on a required drive force and a vehicle speed. In addition, a drive mode of the vehicle Ve may be selected from a four-wheel drive mode and a two-wheel drive mode in accordance with a switching operation executed by a driver, or based on a friction coefficient of a road.

Figure 2:
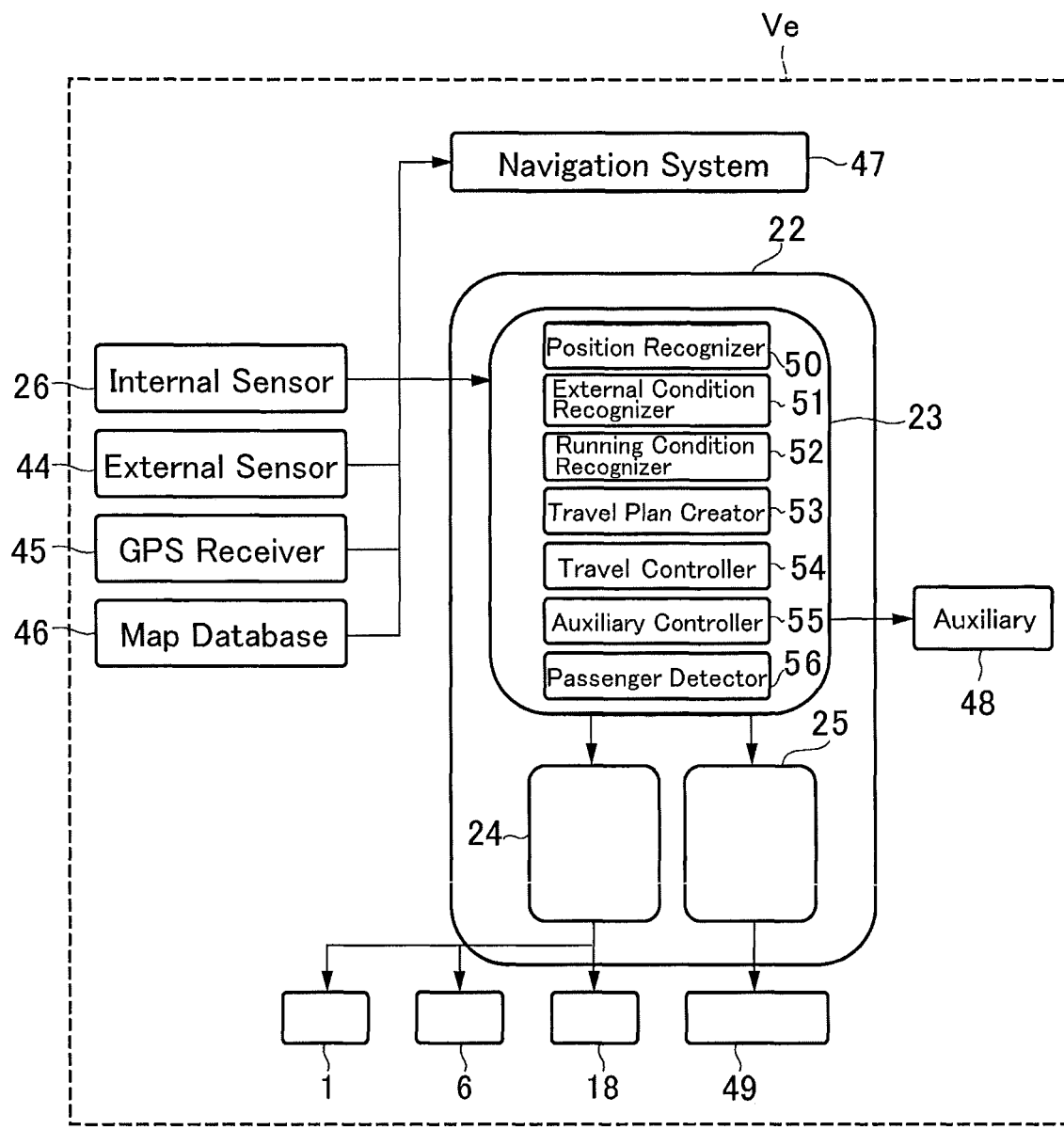
FIG. 2 is a schematic illustration showing a configuration of the control system.

The engine 1, the transmission 4, the clutch 7, the transfer 9, the first motor 6, and the second motor 18, the battery 19, the inverter (not shown) and so on are controlled by a controller 22 as an electronic control unit. The controller 22 is composed mainly of a microcomputer configured to execute a calculation based on an incident data and data stored in advance, and to transmit a calculation result in the form of command signal. A configuration of the controller 22 is shown in FIG. 2. The controller 22 comprises a main controller 23, a drive controller 24 and a sub-controller 25. Output signals transmitted from the main controller 23 are sent to the drive controller 24 and the sub-controller 25. Incident signals to the drive controller 24 are converted into drive commands and further transmitted to a throttle actuator of the engine 1, and the inverters of the first motor 6 and the second motor 18. Incident signals to the sub-controller 25 is converted into appropriate command signals and further transmitted to actuators of the clutch 7 and so on.

The main controller 23 is also composed mainly of a microcomputer. To the main controller 23, detection signals and information about operating conditions and behaviors of constituent elements of the vehicle Ve are transmitted from an internal sensor 26. Specifically, the internal sensor 26 includes an accelerator sensor 28 that detects a position of an accelerator pedal 27, a brake sensor (or switch) 30 that detects a depression of a brake pedal 29, a steering sensor 32 that detects a steering angle of the steering wheel 31, a vehicle speed sensor 33 that detects rotational speeds of the wheels 2 and 3, a longitudinal acceleration sensor 34 that detects a longitudinal acceleration of the vehicle Ve, a lateral acceleration sensor 35 that detects a lateral acceleration of the vehicle Ve, a yaw rate sensor 36 that detects a yaw rate of the vehicle Ve, a shift sensor 38 that detects a position of a shift lever (or switch) 37, a battery temperature sensor 39 that detects a temperature of the battery 19, a first motor temperature sensor 40 that detects a temperature of the first motor 6, a second motor temperature sensor 41 that detects a temperature of the second motor 18, a water temperature sensor 42 that detects a temperature of coolant water for cooling the engine 1, and an SOC sensor 43 that detects a state of charge (to be abbreviated as the "SOC" hereinafter) level of the battery 19. The main controller 23 transmits command signals for controlling the engine 1, the first motor 6, the second motor 18, the battery 19 and so on to the drive controller 24, and transmits command signals for controlling the clutch 7 and so on to the sub-controller 25 based on incident signals from the internal sensor 26 as well as maps and formulas installed in advance. In FIG. 1, dashed-lines represent the signals transmitted between the internal sensor 26 and the controller 22, and the signals transmitted from the controller 22 to the engine 1, the first motor 6, the second motor 18, and the brake 15.

The vehicle Ve to which the control system according to the exemplary embodiment of the present disclosure may be operated autonomously. Specifically, the control system is configured to execute a starting operation, an accelerating operation, a steering operation, a braking operation, a stopping operation etc. of the vehicle Ve completely autonomously at the level 4 defined by the NHTSA (National Highway Traffic Safety Administration) or the level 4 or 5 defined by the SAE (Society of Automotive Engineers), while recognizing and observing an external condition and a travelling condition. For this reason, the vehicle Ve may be operated not only autonomously with or without a driver (and a passenger) but also manually by the driver. An autonomous mode and a manual mode may be selected by the driver or passenger.

Thus, the vehicle Ve may be operated autonomously while manipulating the engine 1, the first motor 6, the second motor 18, the brake 15, the steering system 14 and so on by the controller 22.

In order to operate the vehicle Ve autonomously, detection signals from external sensors 44 for detecting external conditions are also sent to the main controller 23. For example, the external sensor 44 includes at least one of an on-board camera, a RADAR (i.e., a radio detection and ranging) a LIDAR (i.e., a laser imaging detection and ranging), an ultrasonic sensor, and an inter-vehicle communication system.

Specifically, the on-board camera is arranged inside of a windshield glass, and transmits recorded information about the external condition to the main controller 23. To this end, not only a monocular camera but also a stereo camera having a plurality of lenses and image sensors to achieve a binocular vision may be used as the on-board camera. Given that the stereo camera is used as the on-board camera, the main controller 23 is allowed to obtain three-dimensional information in the forward direction.

The RADAR is adapted to detect obstacles utilizing radio waves such as millimetric-waves and microwaves, and to transmit detected information to the main controller 23. Specifically, the RADAR detects an obstacle such as other vehicles and so on by emitting radio waves and analyzing the radio waves reflected from the obstacle.

Likewise, the LIDAR is adapted to detect obstacles utilizing laser light and to transmit detected information to the main controller 23. Specifically, the LIDAR detects an obstacle such as other vehicles and so on by emitting laser light and analyzing the laser light reflected from the obstacle.

Information about other vehicles around the vehicle Ve such as destinations, positions, speeds, directions, operating modes etc. may be obtained through the inter-vehicle communication system to support safe driving. Such inter-vehicle communication is available among the vehicles individually having an on-board equipment for intelligent transport systems (ITS) even where infrastructure has not yet been developed.

The vehicle Ve is further provided with a GPS (i.e., global positioning system) receiver 45, a digital map database 46, and a navigation system 47. Specifically, the GPS receiver 45 is adapted to obtain a position (i.e., latitude and longitude) of the vehicle Ve based on incident signals from GPS satellites, and to transmit the positional information to the main controller 23. The map database 46 may be installed e.g., in the main controller 23, but map information stored in an external online information processing center may also be available. In the online information processing center, so-called bigdata including road information, traffic information, the map database and so on is stored, and such bigdata is updated continuously. Therefore, the vehicle Ve may acquire data through the inter vehicle communication between the vehicle Ve and other vehicle, through a road-vehicle communication between the vehicle Ve and an external communication device such as a signpost on or beside a road, and from the online information processing center. The navigation system 47 is configured to determine a travelling route of the vehicle Ve based on the positional information obtained by the GPS receiver 45 and the map database 46.

The main controller 23 carries out calculations based on the incident data or information from the internal sensor 26 and the external sensor 44 as well as the preinstalled data, and calculation results are sent in the form of command signal to the drive controller 24, the sub-controller 25 and auxiliaries 48. The incident signals transmitted to the drive controller 24 are converted into drive commands, and further transmitted to the engine 1 (including the throttle valve), the first motor 6, and the second motor 18. The incident signals transmitted to the sub-controller 25 are converted into appropriate command signals and further transmitted to actuators 49 of the brake 15, the steering system 14 and so on.

The actuator 49 includes a brake actuator, a steering actuator and so on. Specifically, the brake actuator is adapted to actuate the brake 15 to control braking force applied to the wheels 2 and 3 in response to reception of the command signal from the sub-controller 25. The steering actuator is adapted to activate an assist motor of the steering system 14 to control a steering torque in response to reception of the command signal from the sub-controller 25.

The auxiliary 48 includes devices that are not involved in propulsion of the vehicle Ve such as a wiper, a headlight, a direction indicator, an air conditioner, an audio player and so on.

The main controller 23 comprises a position recognizer 50, an external condition recognizer 51, a running condition recognizer 52, a travel plan creator 53, a travel controller 54, an auxiliary controller 55, a passenger detector 56 and so on.

Specifically, the position recognizer 50 is configured to recognize a current position of the vehicle Ve on the map based on the positional information received by the GPS receiver 45 and the map database 46. The current position of the vehicle Ve may also be obtained from the positional information used in the navigation system 47. Optionally, the vehicle Ve may also be adapted to communicate with external sensors arranged along the road to obtain the current position of the vehicle Ve.

The external condition recognizer 51 is configured to recognize external condition of the vehicle Ve such as a location of a traffic lane, a road width, a road configuration, a road gradient, an existence of obstacles around the vehicle Ve and so on, based on the recorded information of the on-board camera, or detection data of the RADAR or the LIDAR. Optionally, a land form, weather information, a road configuration, a friction coefficient of road surface etc. may be obtained according to need.

The running condition recognizer 52 is configured to recognize running condition of the vehicle Ve such as a vehicle speed, a longitudinal acceleration, a lateral acceleration, a yaw rate and so on based on detection data of the internal sensors 26.

The travel plan creator 53 is configured to create a travel locus of the vehicle Ve based on a target course determined by the navigation system 47, a position of the vehicle Ve recognized by the position recognizer 50, and an external condition recognized by the external condition recognizer 51. That is, the travel plan creator 53 creates a travel locus of the vehicle Ve within the target course in such a manner that the vehicle Ve is allowed to travel safely and properly while complying traffic rules.

In addition, the travel plan creator 53 is further configured to create a travel plan in line with the created travel locus.

Specifically, the travel plan creator 53 creates the travel plan in line with the target course based on the external conditions recognized by the external condition recognizer 51 and the map database 46, and determines a driving force and a vehicle speed at each point on the target course.

Specifically, the travel plan is created based on prospective data after few seconds from the present moment to determine a future condition of the vehicle Ve such as a driving force or the like required in future. Optionally, the travel plan may also be created based on prospective data after several ten seconds depending on the external conditions and the running conditions. Thus, the travel plan creator 53 creates a future plan to change a vehicle speed, acceleration, steering torque and so on when travelling along the target course, in the form of e.g., a map.

Alternatively, the travel plan creator 53 may also create a pattern to change the vehicle speed, acceleration, steering torque etc. between predetermined points on the travel locus. Specifically, such patterns may be determined by setting target values of those parameters at each point on the travel locus taking account of a required time to reach the point at the current speed.

The travel plan includes a plan to stop at a gas station to supply fuel to the vehicle Ve, a plan to charge the battery 19 by the external power source 20 during propulsion, and a plan to stop at the charging station to charge the battery 19. Specifically, the plan to charge the battery 19 includes a plan to charge the battery 19 by generating electricity by the first motor 6 and the second motor 18, a plan to charge the battery 19 by driving the first motor 6 by the engine 1 to generate electricity, a plan to charge the battery 19 by regenerating electricity during decelerating the vehicle Ve, and a plan to charge the battery 19 by generating electricity by the solar panel 21.

Figure 3A:
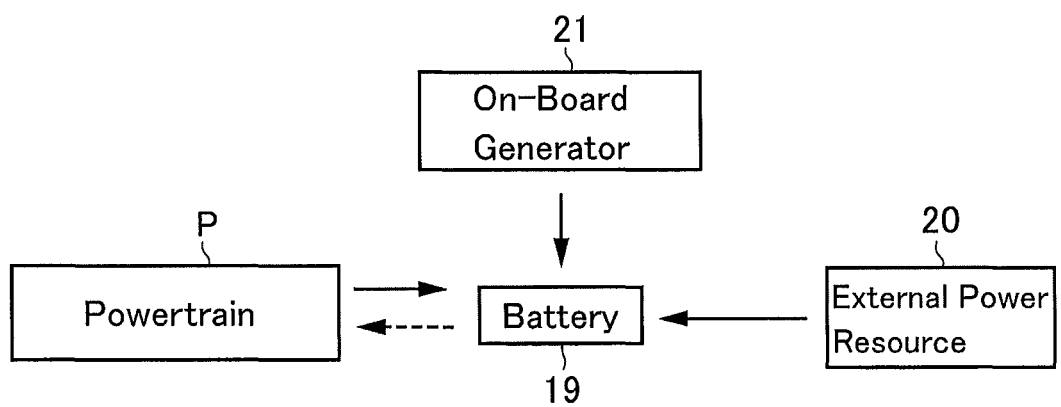
Figure 3B:
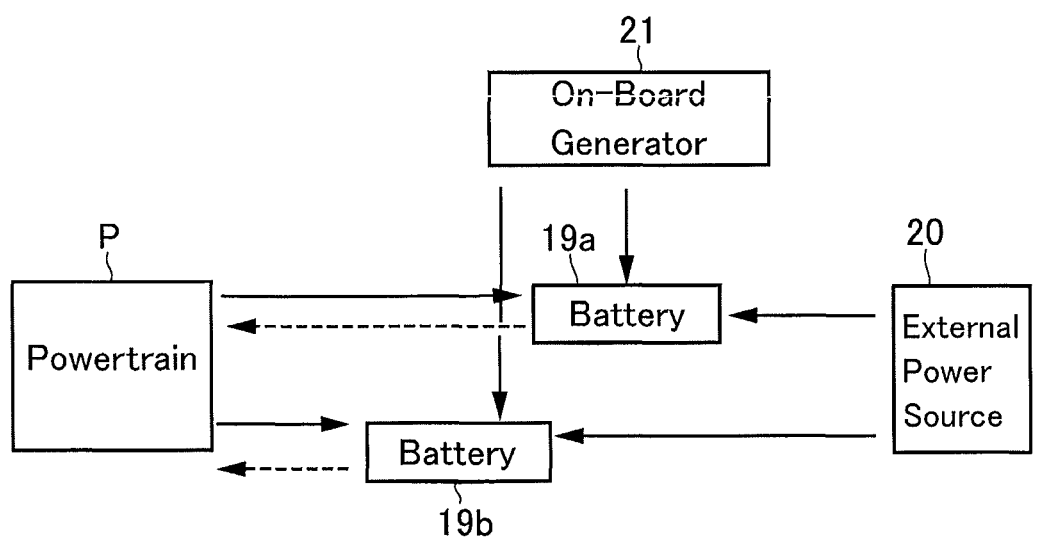

The charging systems according to the exemplary embodiment are schematically shown in FIGS. 3A and 3B. In FIGS. 3A and 3B, each solid arrow represents a charging of the battery 19 respectively, and each dashed arrow represents a discharging from the battery 19 respectively. Specifically, FIG. 3A shows the charging system of a case in which one battery 19 is arranged in the vehicle Ve. In this case, as can be seen from FIG. 3A, the battery 19 may be charged by the external power source 20, the powertrain P, and the on-board generator 21, and the electricity is discharged from the battery 19 to the powertrain P including the first motor 6 and the second motor 18. On the other hand, FIG. 3B shows the charging system of a case in which a first battery 19a and a second battery 19b are arranged in the vehicle Ve. In this case, as can be seen from FIG. 3B, both of the first battery 19a and the second battery 19b may be charged by the external power source 20, the powertrain P, and the on-board generator 21, and the electricity is discharged from both of the first battery 19a and the second battery 19b to the powertrain P. In the case of thus arranging two batteries 19a and 19b in the vehicle Ve, a priority order to charge the batteries 19a and 19b may be determined on the basis of SOC levels of those batteries. For example, if the SOC level of the first battery 19a is lower than the SOC level of the second battery 19b, the first battery 19a will be charged on a priority basis.

The controller 22 is further configured to work with the adaptive cruise control system or cooperative adaptive cruise control system, and the travel plan may also be created in such a manner as to follow the preceding vehicle while communicating with the other vehicles. The adaptive cruise control system may be manipulated by switches arranged in the vicinity of the steering wheel 31 or within a steering pad. Specifically, activation of the cruise control system, selection of a control mode, setting a target distance from a preceding vehicle etc. may be executed by manipulating the switches. For example, the target distance may be selected from a long distance, a middle distance, and a short distance.

The travel controller 54 is configured to operate the vehicle Ve autonomously in line with the travel plan created by the travel plan creator 53. To this end, specifically, the travel controller 54 transmits command signals to the actuators 49, the engine 1, the first motor 6, and the second motor 18 through the drive controller 24 and the sub-controller 25.

The auxiliary controller 55 is configured to autonomously operate the auxiliaries 48 such as the wiper, the headlight, the direction indicator, the air conditioner, the audio player and so on in line with the travel plan created by the travel plan creator 53.

The passenger detector 56 is configured to determine the existence of passenger in the vehicle Ve and the preceding vehicle. For example, the passenger detector 56 determines the existence of passenger in the vehicle Ve based on a fact that a power switch, an ignition switch, or a start button is turned on, that a passenger sitting on a vehicle seat is detected, that a seat belt is fastened, or that the steering wheel is turned. Instead, the existence of the passenger may also be determined based on a signal from a biometric passenger sensor such as an infrared sensor for detecting a body temperature of the passenger, and a motion sensor such as a Doppler sensor for detecting a body movement of the passenger. Meanwhile, the passenger detector 56 determines the existence of passenger in the preceding vehicle by obtaining information about the preceding vehicle through the inter-vehicle communication, or by analyzing information obtained by the on-board camera.

Thus, the vehicle Ve shown in FIG. 1 may be operated autonomously in line with the travel plan along the target course, and as described, the travel plan includes a plan to supply fuel to the vehicle Ve, and a plan to charge the battery 19. However, the battery 19 is deteriorated over time, and a progress of deterioration in the battery 19 may vary depending on the travel plan, the travel pattern, and a temperature of the battery 19. For example, in a case of charging the battery 19 by the external power source 20 during propulsion in the EV mode, the battery 19 is charged while discharging electricity to the second motor 18. That is, a charging of the battery 19 and a discharging from the battery 19 are executed simultaneously, and the battery 19 will be overloaded thereby raising a temperature of the battery 19. As a result, performance of the battery 19 may be reduced. According to the exemplary embodiment of the present disclosure, the controller 22 is configured to execute a routine shown in FIG. 4 so as to charge the battery 19 using the external power source 20 without reducing the performance of the battery 19, during propulsion of the vehicle Ve in line with the travel plan.

Figure 4:
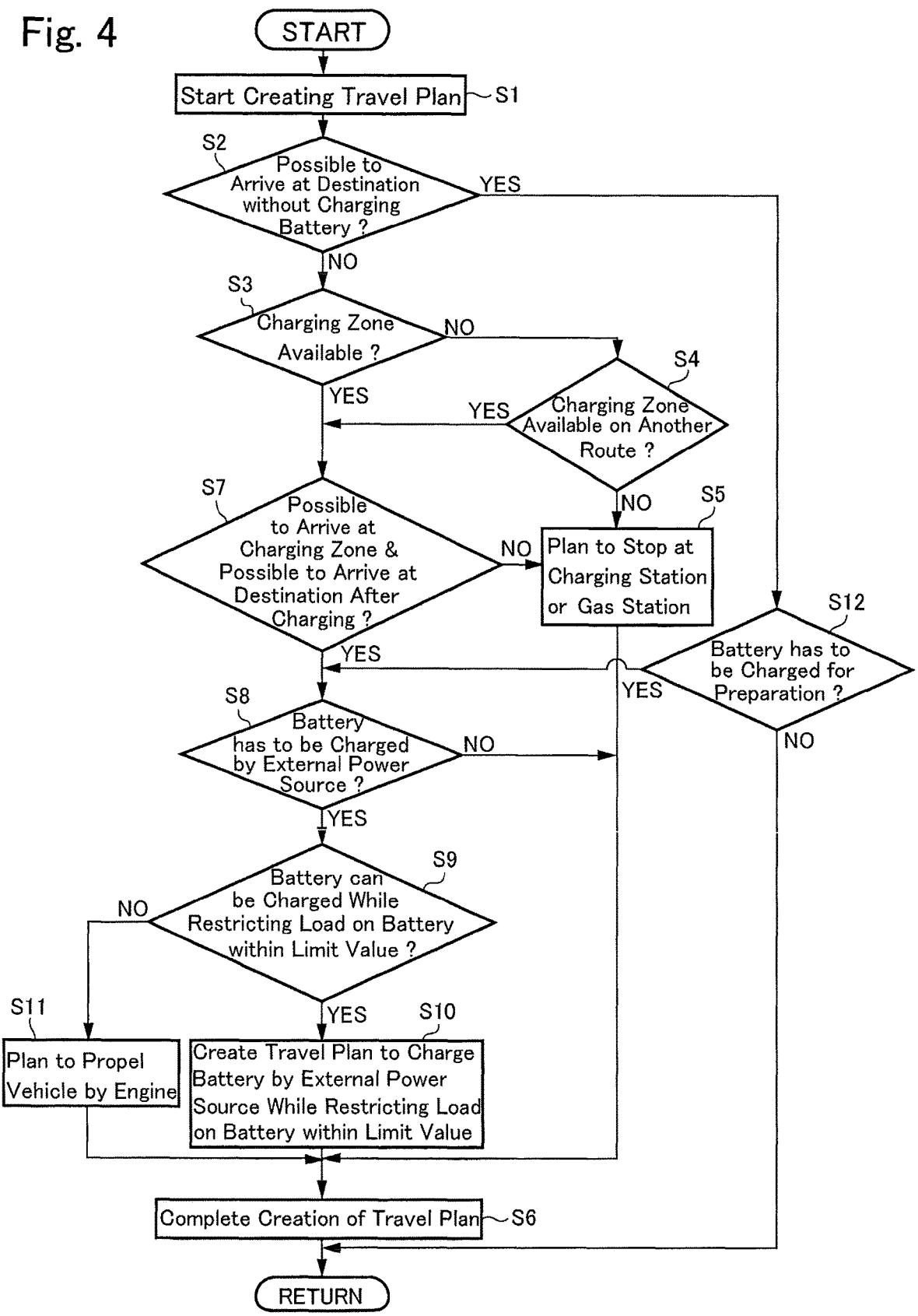
FIG. 4 is a flowchart showing an example of a routine executed by the vehicle control system according to the exemplary embodiment.

Specifically, the routine shown in FIG. 4 is executed in the case of propelling the vehicle Ve mainly by a motor torque.

At step S1, creation of the travel plan is commenced. As described, the travel plan includes a travelling route (or course), and the travel plan is created by the travel plan creator 53.

Then, it is determined at step S2 whether it is possible to arrive at a destination by taking a predetermined travelling route from the current position without filling the fuel and without charging the battery 19. Specifically, such determination at step S2 may be made based on a current fuel level and a current SOC level of the battery 19 taking account of the destination set by the navigation system 47. If the answer of step S2 is NO, the routine progresses to step S3 to determine whether the charging zone exists on the predetermined travelling route to the destination.

In this case, the SOC level of the battery 19 is too low to arrive at the destination by taking the predetermined travelling route, therefore, an existence or availability of the charging zone (or the charging lane) where the battery 19 can be charged by the external power source 20 on the predetermined travelling route is determined at step S3. For example, given that the contact type charging system is employed in the vehicle Ve, it is determined at step S3 whether the contact wire or the contact rail to which the charging arm or the pantograph is brought into contact to charge the battery 19 is available on the predetermined travelling route. Otherwise, given that the non-contact type charging system is employed in the vehicle Ve, it is determined at step S3 whether the charging lane from which the electricity is supplied to the battery 19 is available on the predetermined travelling route. Here, the SOC level of the battery 19 may be raised to a required level to arrive at the destination using a plurality of the charging zones on the way to the destination.

If the charging zone does not exist on the predetermined travelling route so that the answer of step S3 is NO, the routine progresses to step S4 to determine whether the charging zone is available on another possible route from the current position of the vehicle Ve to the destination.

In addition, it is also determined at step S4 whether another possible route on which the charging zone is available meets a requirement of the travel. For example, if the charging zone is available on another possible route but another possible route includes a toll road, an additional cost will be generated. In this case, if such additional cost is not acceptable for the driver or owner of the vehicle Ve, the answer of step S4 will be NO. Otherwise, if the charging zone is available on another possible route but it will take a longer time to arrive at the destination, an estimated arrival time will be delayed. In this case, if such delay in time is not acceptable for the driver or owner of the vehicle Ve, the answer of step S4 will also be NO. Thus, such determination at step S4 is made taking account of an economic factor and a time factor.

If the charging zone is not available on another possible route so that the answer of step S4 is NO, or if the charging zone is available on another possible route but another possible route is not acceptable for the driver or owner so that the answer of step S4 is NO, the routine progresses to step S5 to find an available charging station at which the battery 19 can be charged while stopping the vehicle Ve from the current position to the destination. Instead, at step S5, it is also possible to find an available gas station to supply fuel to the vehicle Ve from the current position to the destination. Thereafter, the routine further progresses to step S6 to complete the creation of the travel plan. As a result, a plan to stop the vehicle Ve at the gas station or the charging station on the way to the destination is included in the travel plan. Thereafter, the routine returns.

By contrast, if the charging zone is available on another possible route that is acceptable for the driver or owner of the vehicle Ve so that the answer of step S4 is YES, the routine progresses to step S7. At step S7, it is determined whether it is possible to arrive at the charging zone with the current SOC level and the fuel level, and whether it is possible to arrive at the destination after charging the battery 19 at the charging zone.

Likewise, if the charging zone is available on the aforementioned predetermined travelling route so that the answer of step S3 is YES, the routine also progresses to step S7 to make the above-explained determination.

Specifically, such determination at step S7 is made on the basis of the current fuel level and the current SOC level of the battery 19, taking account of an estimated amount of charge by passing through the charging zone(s), an estimated amount of charge by driving the first motor 6 by the engine 1, an estimated amount of charge by the regenerative energy, and an estimated amount of charge by the on-board generator 21.

If it is possible to arrive at the charging zone with the current SOC level and the fuel level, and to arrive at the destination after charging the battery 19 at the charging zone, the answer of step S7 will be YES. By contrast, if it is not possible to arrive at the charging zone with the current SOC level and the fuel level, the answer of step S7 will be NO. Likewise, if it is possible to arrive at the charging zone with the current SOC level and the fuel level, but it is not possible to arrive at the destination even after charging the battery 19 at every charging zones on the predetermined travelling route or another possible route, the answer of step S7 will also be NO.

If the answer of step S7 is NO, the routine also progresses to step S5 to find an available charging station or gas station, and further progresses to step S6 to complete the creation of the travel plan. In this case, the plan to stop the vehicle Ve at the gas station or the charging station on the way to the destination is also included in the travel plan. Thereafter, the routine returns.

By contrast, if the answer of step S7 is YES, the routine progresses to step S8 to determine whether to charge the battery 19 by the external power source 20 arranged in the charging zone on the way to the destination.

Basically, in the case that the charging zone is available on the planned route, the battery 19 is charged while passing through the charging zone available on the travelling route. However, if the battery 19 is fully charged, or if the SOC level of the battery 19 is higher than a threshold level, the battery 19 will not be charged by the external power source 20 so as to prevent a reduction in performance of the battery 19 even if the charging zone is available on the travelling route. In addition, if the charging zone is located close to the current position of the vehicle Ve, and the vehicle Ve has just been launched, the engine 1 may be warmed up while driving the first motor 6 to generate electricity. In this case, the battery 19 would be charged not only by the external power source 20 but also by the powertrain P, and as a result, the battery 19 may be overloaded. Therefore, in order to protect the battery 19, charging of the battery 19 by the external power source 20 may also be skipped in this case even if the charging zone is available on the travelling route. Accordingly, if it is not necessary to charge the battery 19 by the external power source 20 so that the answer of step S8 is NO, the routine progresses to step S6 to complete the creation of the travel plan, and thereafter returns. In this case, the travel plan is modified in such a manner as to prevent the charging of the battery 19 by the external power source 20. For example, the charging of the battery 19 by the external power source 20 may be prevented by detouring from the charging lane.

If, for example, the SOC level of the battery 19 is lower than a threshold level and hence it is necessary to charge the battery 19 by the external power source 20 so that the answer of step S8 is YES, a plan to charge the battery 19 by the external power source 20 in the charging zone is included in the travel plan. In this case, the routine progresses to step S9 to determine whether it is possible to charge the battery 19 by the eternal power source 20 arranged in the charging zone while restricting a load factor of the battery 19 lower than a predetermined limit value. A load on the battery 19 is increased as a result of charging the battery 19 by supplying electricity to the battery 19. In addition, the load on the battery 19 is also increased as a result of discharging electricity from the battery 19 to operate the second motor 18 to propel the vehicle Ve in the EV mode. Accordingly, if the battery 19 is charged simultaneously with supplying electricity e.g., to the second motor 18, the battery 19 may be overloaded. According to the exemplary embodiment, a temperature of the battery 19 is employed as a parameter representing the load factor of the battery 19, and the limit value of the temperature of the battery 19 is set to a level at which a reduction in the output performance of the battery is expected to be caused by a temperature rise of the battery 19.

If the temperature of the battery 19 is out of a normal temperature range, the output performance of the battery 19 and an expected lifetime of the battery 19 may be reduced. Therefore, it is preferable to maintain the temperature of the battery 19 within the normal temperature range as a normal atmospheric temperature range in which a physical value is stabilized or changed only slightly. The normal temperature range is an ordinary ambient temperature at which a physical amount is stable or will not be changed significantly. For example, according to JIS Z 8703, the normal temperature is defined as a tolerable temperature range of a temperature class 15 around a standard temperature 20 degrees C., from 5 degrees C. to 35 degrees C. According to the exemplary embodiment, therefore, the limit value of the temperature of the battery 19 may be set to a temperature within the normal temperature level.

However, in order to operate the vehicle Ve autonomously, it is necessary to supply electricity from the battery 19 to the external sensors 44 such as the on-board camera, the RADAR, the LIDAR and so on, and to the controller 22. Further, in order to propel the vehicle Ve e.g., by the second motor in the EV mode, it is necessary to supply electricity from the battery 19 to the second motor 18. Furthermore, in the case of carrying a driver or passenger, it is necessary to supply electricity from the battery 19 to the auxiliaries 48 such as the air conditioner so as to improve a ride comfort. According to the exemplary embodiment, therefore, the limit value of the temperature of the battery 19 is set to a level at which the battery 19 is allowed to discharge the minimum required electrical energy to operate the vehicle Ve autonomously while being charged by the external power source 20 without being overloaded. In other words, at step S9, it is determined whether the battery 19 can be charged by the external power source 20 in the charging zone while discharging the minimum required electrical energy to operate the vehicle Ve autonomously, and while restricting at least one of the charging of the battery 19 and discharging from the battery 19 to limit the temperature of the battery 19 lower than the limit value.

If it is possible to charge the battery 19 by the external power source 20 while restricting the load factor of the battery 19 to be lower than the limit value so that the answer of step S9 is YES, the routine progresses to step S10 to accept the travel plan thus has been created. That is, at step S10, a plan to charge the battery 19 by the external power source 20 in the charging zone while operating the vehicle Ve autonomously in e.g., the EV mode is included in the travel plan. In this case, specifically, discharging amount from the battery 19 will be restricted preferentially to limit the temperature of the battery 19 to be lower than the limit level. However, in order to limit the temperature of the battery 19 to be lower than the limit value, not only the discharging amount from the battery 19 but also a charging amount of the battery 19 may be restricted as long as the battery is allowed to discharge the required electricity to operate the vehicle Ve autonomously.

In the vehicle Ve, a charging amount of the battery 19 by the external power source 20 is greater than a charging amount of the battery 19 by the powertrain P and the on-board generator 21. However, given that the non-contact type charging system is employed in the vehicle Ve, the electricity may not be supplied stably to the battery 19 if a foreign matter interposes between the coil arranged in the road surface and the coil arranged in the vehicle Ve. In this case, the charging amount by the powertrain P or the on-board generator 21 would be greater than the charging amount by the external power source 20. If such situation is expected, the plan created at step S10 may be modified to charge the battery 19 also by the means other than the external power source 20 whose expected charging amount is greater than a charging amount of the external power source 20.

Given that a plurality of the batteries 19a and 19b are arranged in the vehicle Ve as illustrate in FIG. 3B, it is not necessary to restrict the charging and discharging of both of the batteries. For example, in a case that an SOC level of the first battery 19a is low and hence the battery 19a has to be charged by the external power source 20, the second battery 19b may be allowed to discharge electricity to e.g., the second motor 18 while being charged. That is, when the charging and discharging of one of the batteries 19a and 19b is restricted, the other one of the batteries 19a and 19b may be used as a backup battery.

For example, the battery 19 may be charged using the external power source 20 while limiting the temperature of the battery 19 to be lower than the limit value by propelling the vehicle Ve by an inertia force without generating a drive torque within the charging zone. In this case, however, a reduction in a vehicle speed is expected in the charging zone. In order to avoid an unacceptable reduction in the vehicle speed, the plan to charge the battery 19 may be modified in such a manner as to increase the vehicle speed before entering into the charging zone, and coasting the vehicle Ve within the charging zone. Optionally, the plan to charge the battery 19 may be further modified to issue a warning of such speed reduction to the driver or passenger. In addition, if the charging zone is located on a downslope, the plan to charge the battery 19 may be modified in such a manner as to reduce the vehicle speed before entering into the charging zone thereby suppressing the speed of the coasting vehicle Ve within the legal speed limit, that is, within a speed rage between a lower limit speed and an upper limit speed, when passing through the charging zone.

If it is not possible to charge the battery 19 by the external power source 20 while restricting the load factor of the battery 19 to be lower than the limit value so that the answer of step S9 is NO, the routine progresses to step S11 to modify the travel plan to propel the vehicle Ve by a drive torque of the engine 1 within the charging zone. In this case, for example, the vehicle Ve may be propelled only by the engine 1. Instead, it is also possible to operate the second motor 18 to generate a drive torque to propel the vehicle Ve to an extent that the temperature of the battery 19 will not exceed the limit value, and to operate the engine 1 to achieve a required drive torque. In other words, it is also possible to propel the vehicle Ve in the parallel HV mode. In this case, it is preferable to operate the engine 1 and the second motor 18 in such a manner as to optimize fuel consumption and electric consumption.

After accepting the travel plan at step S10 or after modifying the travel plan at step S11, the routine progresses to step S6 to complete the creation of the travel plan.

If it is possible to arrive at the destination by taking a predetermined travelling route from the current position without filling the fuel and without charging the battery 19 so that the answer of step S2 is YES, the routine progresses to step S12 to determine whether to charge the battery 19 for the preparation of next occasion to travel if the charging zone is available on the predetermined travelling route. If the charging zone is available on the predetermined travelling route, it is possible to charge the battery 19 at the charging zone on the way to the destination for the preparation of next occasion to travel.

If the charging zone is available on the predetermined travelling route and it is necessary to charge the battery 19 for the preparation of next occasion to travel so that the answer of step S12 is YES, the routine progresses to step S8. By contrast, if the charging zone is not available on the predetermined travelling route, or if it is not necessary to charge the battery 19 so that the answer of step S12 is NO, the routine returns. For example, if the battery 19 is fully charged, or is an SOC level of the battery 19 is higher than a predetermined level, the answer of step S12 will be NO.

Thus, according to the exemplary embodiment of the present disclosure, at least one of the charging of the battery 19 and the discharging from the battery 19 will be restricted when charging the battery 19 by the external power source arranged in the charging zone, so as to limit the load factor of the battery 19 to the level at which the battery 19 is allowed to discharge the minimum required electrical energy to operate the vehicle Ve autonomously. As described, according to the exemplary embodiment of the present disclosure, a temperature of the battery is employed as the load factor of the battery 19, and the limit level (or threshold level) of the temperature of the battery 19 is set to the level at which the output performance of the battery 19 will not be reduced (e.g., to the normal temperature). According to the exemplary embodiment of the present disclosure, therefore, the output performance of the battery 19 will not be reduced even if the battery 19 is charged by the external power source 20 while supplying electricity to the second motor 1R to propel the vehicle Ve by the second motor 18, and to the controller 22 as well as the auxiliaries 48 to operate the vehicle Ve autonomously. For this reason, a cycle life of the battery 19 will not be reduced.

For example, the discharging of the electricity from the battery 19 may be restricted in the charging zone by coasting the vehicle Ve within the charging zone. In this case, the travel plan may be modified to control a vehicle speed to maintain the vehicle speed to an appropriate level. For example, the travel plan may be modified in such a manner as to increase the vehicle speed before entering into the charging zone, and coasting the vehicle Ve within the charging zone. In this case, therefore, an unacceptable reduction in the vehicle speed within the charging zone can be avoided. In addition, if the charging zone is located on a downslope, the plan to charge the battery 19 may be modified in such a manner as to reduce the vehicle speed before entering into the charging zone. In this case, the speed of the vehicle Ve coasting in the charging zone may be suppressed within the legal speed limit.

Further, according to the exemplary embodiment of the present disclosure, the travel plan may be modified to propel the vehicle Ve by the engine 1 if the load factor of the battery 19 is expected to exceed the limit value by charging the battery 19 by the external power source 20 while discharging electricity. According to the exemplary embodiment of the present disclosure, therefore, the required drive torque to propel the vehicle Ve may be generated by the engine 1. According to the exemplary embodiment of the present disclosure, therefore, a shortage of the drive torque can be prevented even when the electricity cannot be supplied to the second motor 18 from the battery 19.

Here will be explained another example of a structure of the vehicle to which the control system according to the exemplary embodiment is applied. The control system according to the exemplary embodiment may also be applied to a battery electric vehicle shown in FIG. 5 in which only a motor is employed as a prime mover. In the vehicle Ve shown in FIG. 5, each of the front wheels 3 and the rear wheels 2 is individually provided with an in-wheel motor (referred to as "IWM" in FIG. 6) 57. Specifically, each of the in-wheel motor 57 is installed in a rim of the front wheel 3 or the rear wheel 2 below a suspension spring. In the vehicle Ve shown in FIG. 5, therefore, a drive torque and a brake torque of each of the front wheels 3 and the rear wheels 2 may be controlled independently. Here, the in-wheel motor 57 may be arranged only in the front wheels 3 or the rear wheels 2. The vehicle shown in FIG. 5 is also provided with the battery 19 and the controller 22, but the battery 19 and the controller 22 are omitted for the sake of illustration.

Figure 5:
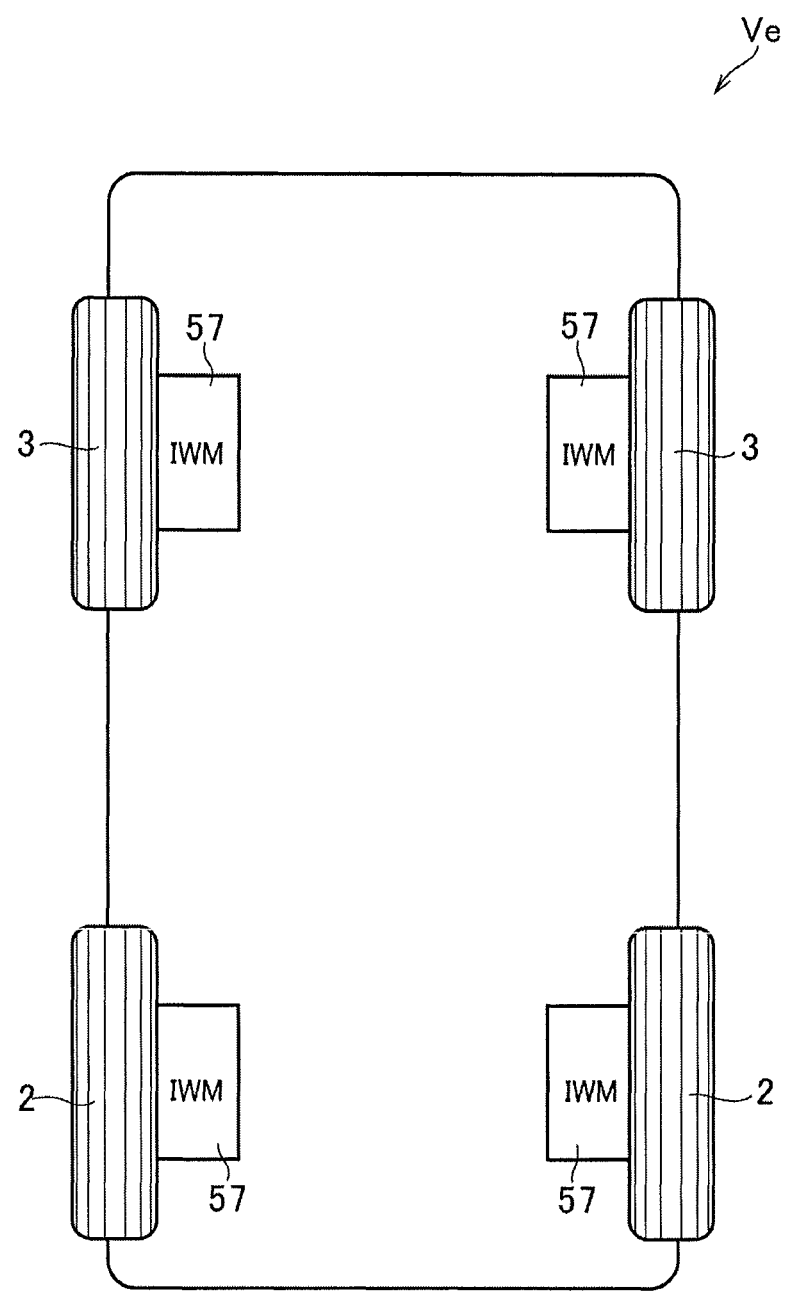
FIG. 5 is a schematic illustration showing another example of a structure of the vehicle to which the vehicle control system according to the exemplary embodiment is applied.
Figure 6:
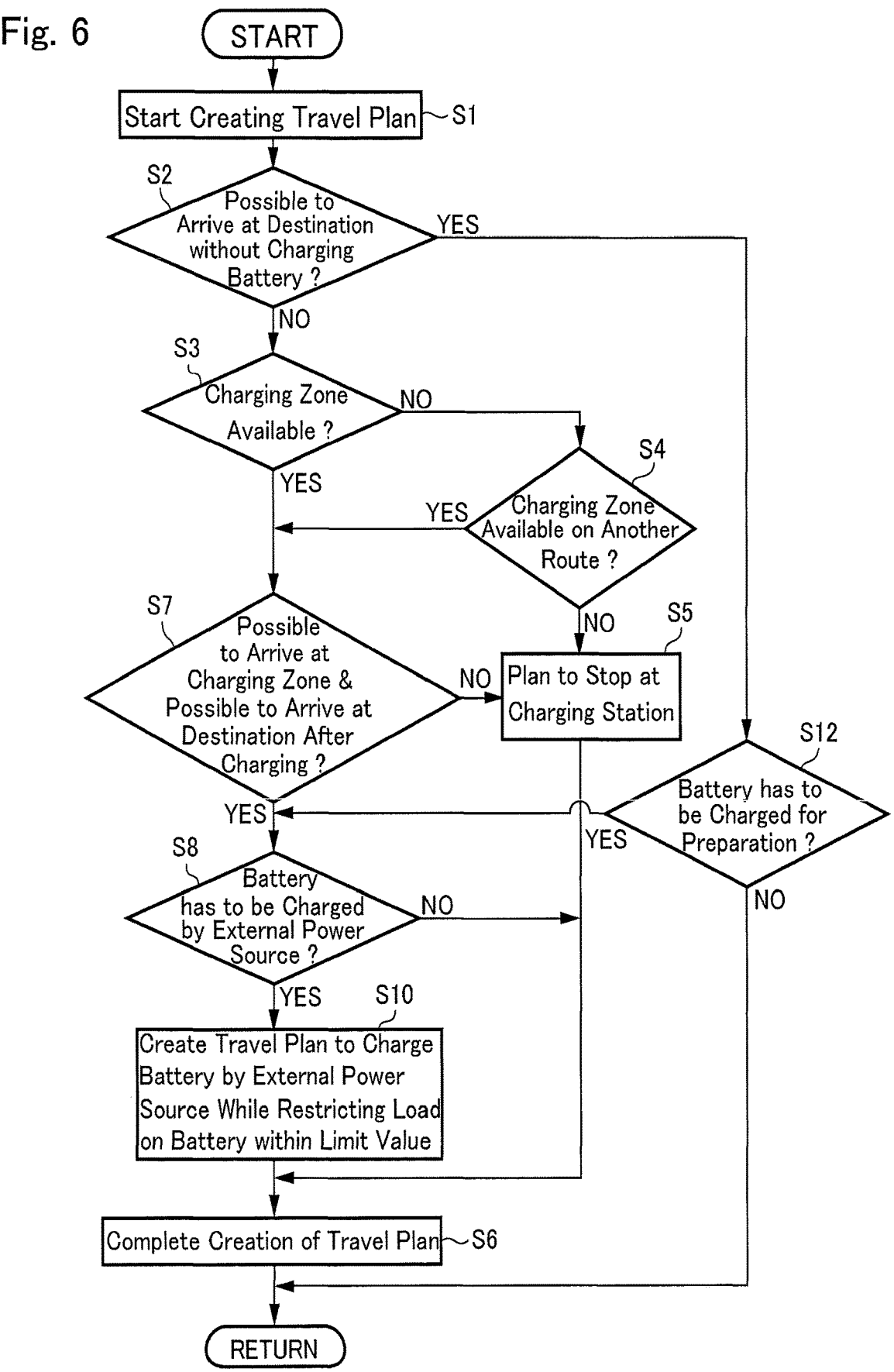
FIG. 6 is a flowchart showing another example of a routine executed by the vehicle control system according to the exemplary embodiment.

FIG. 6 shows an example of a routine executed by the controller 22 in the vehicle Ve shown in FIG. 5. In the routine shown in FIG. 6, steps S9 and S11 shown in FIG. 4 are omitted, and contents of the remaining steps are identical to those of the common steps shown in FIG. 4.

As described, the vehicle Ve shown in FIG. 5 is a battery electric vehicle without having an engine. Therefore, the routine shown in FIG. 6 is configured to limit the load factor of the battery 19 to be lower than the limit value, and not to modify the travel plan to propel the vehicle Ve by the engine. Specifically, if it is necessary to charge the battery 19 by the external power source 20 so that the answer of step S8 is YES, the routine progresses directly to step S10 to create a travel plan to charge the battery 19 by the external power source 20 in the charging zone while restricting the load factor of the battery 19 lower than the limit value. As described, the load factor of the battery 19 can be limited to b lower than the limit value by e.g., coasting the vehicle Ve within the charging zone.

Although the above exemplary embodiments of the present disclosure have been described, it will be understood by those skilled in the art that the present disclosure should not be limited to the described exemplary embodiments, and various changes and modifications can be made within the scope of the present disclosure. For example, the control system according to the exemplary embodiment may also be applied to a range extender vehicle in which an engine is operated only to generate electricity.

In addition, the load factor of the battery 19 such as a temperature of the battery 19 may also be limited to be lower than the limit level by detaching or disconnecting the charging arm or the pantograph from the wire or rail arranged in the charging zone.

What is claimed is:

1. A control system for an autonomous vehicle comprising:

a motor having a generating function that serves as a prime mover;
an electric storage device that is electrically connected to the motor;
a charging system that charges the electric storage device using an external power source located on a road during propulsion of the vehicle;
a brake device that applies a braking torque to a wheel; and
a steering device that controls an angle of at least any one of pairs of front wheels and rear wheels,
the control system comprising:
a controller that controls the prime mover, the brake device, the steering system, and the electric storage device to operate the vehicle autonomously without requiring a manual operation,
wherein the controller is configured to:
detect a charging zone where the electric storage device can be charged by the external source; and
when a charging of the electric storage device and a discharging from the electric storage device are executed simultaneously, restrict at least any one of the charging of the electric storage device and the discharging of electricity from the electric storage device so as to limit a load factor of the electric storage device to be smaller than a predetermined limit value when the vehicle passes through the charging zone.

2. The control system for the autonomous vehicle as claimed in claim 1,
wherein a temperature of the electric storage device is employed as parameter of the limit value of the load factor of the electric storage device, and
the controller is further configured to determine that the load factor is smaller than the limit value when the temperature of the electric storage device falls within a predetermined temperature range.

3. The vehicle control system for the autonomous vehicle as claimed in claim 1, wherein the controller is further configured to coast the vehicle within the charging zone so as to restrict the discharging of electricity from the electric storage device.

4. The vehicle control system for the autonomous vehicle as claimed in claim 3, wherein the controller is further configured to control the speed of the vehicle before entering into the charging zone so as to adjust the speed of the vehicle within the charging zone between a legal lower limit speed and a legal upper limit speed.

5. The vehicle control system for the autonomous vehicle as claimed in claim 1,
wherein the prime mover includes an engine, and
the controller is further configured to:
determine that the motor is not allowed to generate a required drive force due to a fact that the load factor of the electric storage device is expected to exceed the limit value when the vehicle passes through the charging zone; and
propel the vehicle by operating the engine to generate a drive torque when the motor is not allowed to generate the required drive torque.

6. The vehicle control system for the autonomous vehicle as claimed in claim 1, wherein the controller is further configured not to restrict a discharging of the electricity from the electric storage device at least to elements to operate the vehicle autonomously when the vehicle passes through the charging zone.

7. A control system for an autonomous vehicle that is operated in line with a travel plan to control a driving force and a vehicle speed at each point of a predetermined travelling route to a destination, by controlling the driving force and a braking force autonomously without requiring a manual operation, comprising:
a controller that creates the travel plan,
wherein the controller is configured to:
determine an availability of a charging zone where an electric storage device can be charged by an external power source while propelling the vehicle on the travelling route to the destination; and
when a charging of the electric storage device and a discharging from the electric storage device are executed simultaneously, create the travel plan in such a manner as to restrict at least any one of the charging of the electric storage device and the discharging of electricity from the electric storage device so as to limit a load factor of the electric storage device to be smaller than a predetermined limit value when the vehicle passes through the charging zone, and to adjust a speed of the vehicle before entering into the charging zone, in a case that the charging zone is available on the travelling route.

8. The vehicle control system for the autonomous vehicle as claimed in claim 7, wherein the controller is further configured to control the speed of the vehicle before entering into the charging zone so as to adjust the speed of the vehicle within the charging zone between a legal lower limit speed and a legal upper limit speed.

9. The vehicle control system for the autonomous vehicle as claimed in claim 7,
wherein the vehicle comprises a motor having a generating function that serves as a prime mover, and
the controller is further configured to create the travel plan in such a manner as to coast the vehicle within the charging zone without operating the motor to generate a driving torque.

* * * * *